United States Patent
Kilkenny et al.

(10) Patent No.: US 7,150,152 B2
(45) Date of Patent: Dec. 19, 2006

(54) VIBRATION LIMITER FOR COAXIAL SHAFTS AND COMPOUND TURBOCHARGER USING SAME

(75) Inventors: Jonathan P. Kilkenny, Peoria, IL (US); Paul W. Reisdorf, Dunlap, IL (US); Eric C. Fluga, Dunlap, IL (US); Matthew D. Rampenthal, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/970,610

(22) Filed: Oct. 21, 2004

(65) Prior Publication Data
US 2006/0086090 A1   Apr. 27, 2006

(51) Int. Cl.
F02B 33/44 (2006.01)
F04B 17/00 (2006.01)
F01D 1/02 (2006.01)
F16C 32/06 (2006.01)
G01M 13/04 (2006.01)
F04B 35/00 (2006.01)

(52) U.S. Cl. ............... 60/612; 417/407; 415/199.1; 415/199.2; 384/100

(58) Field of Classification Search ............... 60/612; 417/406–407, 243–247; 415/199.1, 199.2, 415/1; 384/100; 73/593; G01M 13/04
See application file for complete search history.

(56) References Cited

U.S. PATENT DOCUMENTS

| | | | |
|---|---|---|---|
| 2,839,005 A * | 6/1958 | Means ............... | 417/407 |
| 3,143,103 A | 8/1964 | Zuhn ............... | 60/599 |
| 3,671,145 A * | 6/1972 | Morley et al. ........ | 417/247 |
| 4,155,684 A | 5/1979 | Curiel et al. ........ | 60/612 |
| 5,113,670 A * | 5/1992 | McAuliffe et al. .... | 417/407 |
| 5,156,534 A | 10/1992 | Burgy et al. ........ | 417/405 |
| 5,224,842 A * | 7/1993 | Dziorny et al. ...... | 417/406 |
| 5,419,724 A * | 5/1995 | Wyland et al. ...... | 440/79 |
| 5,658,125 A * | 8/1997 | Burns et al. ........ | 415/1 |
| 5,866,518 A | 2/1999 | Dellacorte et al. .... | 508/104 |
| 2004/0241015 A1* | 12/2004 | Loos ............... | 417/407 |
| 2005/0183504 A1* | 8/2005 | Hobelsberger et al. .. | 73/593 |

FOREIGN PATENT DOCUMENTS

DE  19948220 A1 * 1/2001
RU  2110781 C1 * 5/1998

OTHER PUBLICATIONS

R. H. Holtman, SEA Technical Paper Series 870300, Testing of Low Specific Fuel Consumption Turbocompound Engine, Feb. 23-27, 1987, Society of Automotive Engineers, Inc., Copyright 1987, pp. 1-9.*
Patents Abstracts of Japan; JP 05256149A; application No. 04089424, Published Oct. 5, 1993.

* cited by examiner

Primary Examiner—Thai-Ba Trieu
(74) Attorney, Agent, or Firm—Liell & McNeil

(57) ABSTRACT

A compound turbocharger is provided, including at least one housing. A first turbocharger having an outer shaft is disposed within the housing, and a second turbocharger is provided having an inner shaft co-axial with and extending within the outer shaft. At least one displacement limiter is disposed at a selected position along the length of the outer shaft. A method of reducing vibrational amplitude in an inner shaft of a coaxial shaft assembly is further provided, including the step of operably positioning at least one displacement limiter at a selected position along a length of the outer shaft.

19 Claims, 1 Drawing Sheet

VIBRATION LIMITER FOR COAXIAL SHAFTS AND COMPOUND TURBOCHARGER USING SAME

TECHNICAL FIELD

The present disclosure relates generally to coaxial shaft devices such as compound turbochargers, and relates more particularly to a compound turbocharger having at least one vibration displacement limiter at a selected position along a length of the turbocharger outer shaft.

BACKGROUND

Turbochargers have long been known as a means for increasing both power and efficiency in internal combustion engines. In general, a turbocharger takes advantage of otherwise wasted energy from exhaust gas flowing out of the engine cylinders. In a typical design, exhaust gas is directed past a turbine coupled with a shaft. The exhaust gas induces a rotation of the turbine, thereby operating a compressor coupled to an end of the shaft opposite the turbine. The compressor in turn compresses air supplied to the engine cylinders. Among other things, increasing the pressure of air incident to the engine increases the oxygen supply, and hence the quantity of fuel that can be burned during a given cylinder combustion cycle. Thus, a conventional turbocharger not only has the potential to increase the power output of the engine, it takes advantage of energy in the form of exhaust gas pressure that may otherwise be lost.

A typical turbocharged engine may utilize one or more turbochargers. In multiple turbocharger designs, the devices may be operable independently of one another, in parallel, or serially such that air supplied to the engine undergoes plural pressurizing stages. "Compound" turbochargers are one known turbocharger design wherein a first shaft is coupled with a first turbine and first compressor, and a second shaft, coaxial with and extending within the first shaft, is coupled with a second turbine and second compressor. The turbine stages are arranged such that exhaust gas rotates the first turbine, then flows past and rotates the second turbine. Air initially pressurized by a "low pressure" compressor subsequently flows to a "high pressure" compressor, undergoing further compression before being supplied to the engine cylinders. The compound design can thus offer a dual-stage compression of the incident air.

A design challenge common to many turbochargers relates to the tendency for various of the turbocharger components to vibrate undesirably during operation. For example, non-axial vibrations in a turbocharger shaft can disrupt operation and efficiency or even result in shaft failure. Due in part to the relatively high rotational speeds of many turbocharger shafts, even those shafts having considerable bulk and stiffness can experience problematic vibrations.

Engineers have discovered over the years that one of the most problematic "types" of vibrations in a turbocharger shaft are those at frequencies equal to the natural frequencies of vibration of the shaft, or resonance frequencies. Every solid object has natural resonance frequencies and, when sufficient kinetic energy is imparted at a resonance frequency thereof, will vibrate at steadily increasing amplitudes so long as sufficient kinetic energy continues to be applied at that frequency. "Galloping Girdie" is a familiar example of a resonance vibration, in particular a torsional vibration, or twisting back and forth. Any integer multiple of a first natural resonance frequency can similarly induce resonance vibration. However, the first or lowest resonance frequency of a turbocharger shaft, known in the art as the "first bending critical," is generally the most difficult to manage.

Many turbocharger shafts experience the first bending critical during operation within a speed range commonly desirable for turbochargers. In other words, a typical range of desired shaft speeds happens to encompass the speed at which many turbocharger shafts resonate. In certain designs, it may be possible to accelerate the shaft rotation through the first bending critical fairly quickly, allowing the problem to be ignored. This approach is commonly taken with engines having a limited speed range.

In some operating schemes, however, the above approach works less well, if at all. Resonance vibration problems are particularly acute in systems operating in cooperation with an engine designed to operate over a relatively broad speed range, requiring regular increases or decreases in shaft speed, potentially passing through the first bending critical frequently. Engineers have also attempted to manage vibrational behavior of rotating shafts through various other means. The mass properties, shaft stiffness and shaft geometry can all be varied to alter the resonance frequencies of the shaft, as well as its capacity for handling the same. Nevertheless, there is always room for improvement, particularly where other design requirements of the shaft assembly and associated engine limit the extent to which the shaft itself can be changed. Where certain compound turbochargers are concerned, the nature of coaxial shafts can introduce still further challenges.

One example of a compound turbocharger is known from U.S. Pat. No. 4,155,684 to Curiel et al. Curiel et al. describe a two-stage exhaust-gas turbocharger having coaxial inner and outer turbocharger shafts.

Each of the shafts of Curiel et al. are rotatably supported in bearings in the housing, disposed outside of the turbocharger wheels. While Curiel et al. represents one relatively compact compound turbocharger design, the system is not without shortcomings, particularly with regard to its capacity for managing resonance vibrations of the inner turbine shaft.

The present disclosure is directed to one or more of the problems or shortcomings set forth above.

SUMMARY OF THE DISCLOSURE

In one aspect, the present disclosure provides a compound turbocharger including at least one housing. A first turbocharger including an outer shaft is disposed at least partially within the at least one housing. A second turbocharger is provided having an inner shaft co-axial with and extending within the outer shaft. At least one displacement limiter is disposed at a selected position along a length of the outer shaft.

In another aspect, the present disclosure provides an engine having at least one housing. A first turbocharger is disposed within the at least one housing and includes an outer shaft, the outer shaft being coupled with a first turbine and a first compressor. A second turbocharger is disposed within the at least one housing, the second turbocharger including an inner shaft extending within the outer shaft and coupled with a second turbine and a second compressor. At least one displacement limiter is disposed at a selected position along a length of the outer shaft, the at least one displacement limiter including a first component external of the outer shaft and a second component internal of the outer shaft.

In yet another aspect, the present disclosure provides a method of reducing vibrational amplitude in an inner shaft of a coaxial shaft system. The method comprises the step of operably positioning at least one displacement limiter at a selected position along a length of an outer shaft of the system.

DETAILED DESCRIPTION

Figure 1:
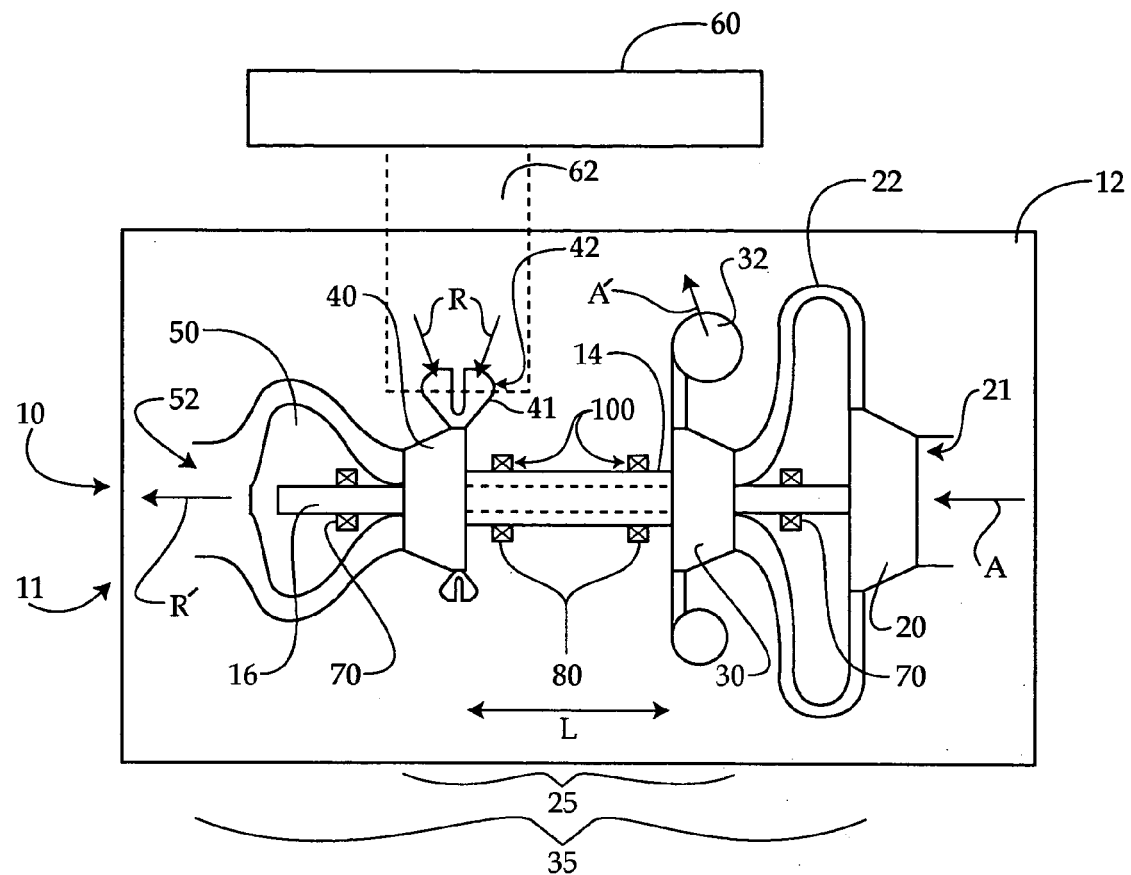
FIG. 1 is a side diagrammatic view of the turbocharger and engine according to the present disclosure.

Referring to FIG. 1, there is shown an engine 10 and compound turbocharger 11 operably coupled therewith. Compound turbocharger 11 includes a first turbocharger unit 25 including a first turbine 40 and first compressor 30, and a second turbocharger unit 35 that includes a second turbine 50 and a second compressor 20. An outer shaft 14 couples turbine 40 and compressor 30, whereas a coaxial inner shaft 16 couples turbine 50 and compressor 20. An exhaust manifold 60 supplies exhaust gas from engine 10 to first turbine 40 via an exhaust passage 62 and exhaust inlet 42, in a conventional manner. At least one displacement limiter 100, preferably two are disposed at selected positions along a length "L" of outer shaft 14 to limit non-axial vibrational displacement of inner shaft 14. The various components of compound turbocharger 11 are preferably disposed in a housing 12. It should be appreciated, however, that the description herein of housing 12 should be understood to refer to at least one housing, as various separate or combined engine, turbine and compressor housings might be utilized without departing from the scope of the present disclosure.

In a preferred embodiment, housing 12 includes a split housing portion 41 whereby exhaust gases passing through passage 62 are delivered to first turbine 40 by generally parallel separate paths, each corresponding to different sets of engine cylinders in a manner well known in the art. The respective exhaust gas streams are preferably recombined just prior to entering turbine 40 such that they are delivered thereto essentially as a single gas stream.

First turbine 40 is preferably a radial turbine that re-orients the direction of exhaust gas flow by approximately 90 degrees. The approximate direction of the flow of exhaust gas incident to turbine 40 is denoted in FIG. 1 with arrows "R", whereas the direction of exhaust gas exiting second turbine 50 is identified with arrow "R'", approximately perpendicular to arrows R. In a preferred embodiment, exhaust gas flows via manifold 60 in a direction approximately perpendicular to lines of adjacent cylinders (not shown) in engine 10. Accordingly, a perpendicular re-orientation of exhaust gas in turbine 40 sends the exhaust gas into turbine 50, preferably an axial turbine, and thenceforth out an exhaust outlet 52 without needing to first substantially change the flow direction thereof. Alternative designs are contemplated, however, for example wherein an axial turbine is used for first turbine 40, and either of an axial or radial turbine is used for second turbine 50.

First compressor 30 is actually a second stage compressor, whereas second compressor 20 is a first stage compressor. The terms "first" and "second" as used herein should be understood to refer generally to a preferred coupling of the compressors with the respective turbines, as opposed to their relative positions in the sequential compression of air.

Air enters compressor 20 via an air inlet 21 generally in a direction illustrated with arrow "A", and is preferably directed toward an intake manifold (not shown) of engine 10 in a direction generally perpendicular thereto, shown as arrow "A'". Compressor 20 is a low pressure compressor, whereas compressor 30 is a high pressure compressor, both of said compressors preferably being radial compressors but not limited thereto. An "S-duct" 22, well known in the art, preferably fluidly connects compressors 20 and 30.

Figure 2:
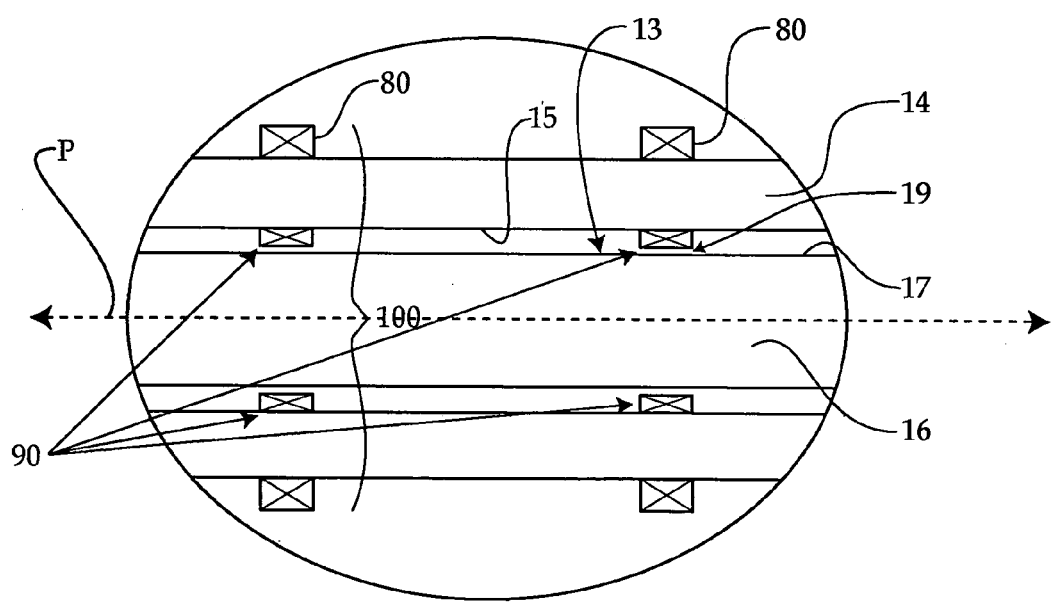
FIG. 2 is a partial view of the turbocharger of FIG. 1.

Referring also to FIG. 2, each of displacement limiters 100 are preferably comprised of at least one outer bearing 80 and at least one inner bearing 90. Displacement limiters 100 are disposed at selected locations along length L of outer shaft 14. The term "selected location" should be understood to refer to a position taking account of various design concerns of turbocharger 11, as well as particular vibrational characteristics of shafts 14 and 16, as described herein.

Shafts 14 and 16 are preferably independently rotatable in opposite directions and coaxial, outer shaft 14 extending its length L between first turbine 40 and first compressor 30. Inner shaft 16 is longer than shaft 14, and extends between second turbine 50 and second compressor 20. Bearings 70 are preferably disposed proximate ends of inner shaft 16 and support the same in housing 12, or in plural housings as desired. In a preferred embodiment, bearings 70 serve as rotatable journal bearings, but also as thrust bearings for inner shaft 16. Conventional ball bearings, or any other suitable bearings having at least some thrust capability may be used. In alternative embodiments, separate thrust bearings apart from bearings 70 may be used.

Outer shaft 14 is likewise rotatably supported by at least one annular member, preferably at least one outer bearing 80 disposed in a selected position along length L of outer shaft 14. The particular positioning of the at least one outer bearing 80 may be selected based on various factors, such as the size of length L, the design of housing 12, and potentially the vibrational characteristics of outer shaft 14. For example, in one contemplated embodiment, one outer bearing 80 might be positioned at the midpoint of shaft 14 and disposed adjacent an outer diameter 13 thereof. In such a design, vibration of shaft 14 can be limited by an engagement at its center with bearing 80.

In a most preferred embodiment, two bearings 80 are disposed equidistantly from the ends of outer shaft 14, and symmetrically about a midpoint thereof. Shafts 14 and 16 preferably have overlapping midpoints, so the preferred placement of bearings 80 might also be said to be symmetrical about a midpoint of inner shaft 16. It is generally desirable to position bearings 80 proximate first turbine 40 and first compressor 30, as those components impart the primary loads on shaft 14, in a manner known in the art. Bearings 80 are most preferably ball bearing sets disposed between outer shaft 14 and housing 12, having an outer race (not shown) fixed relative to housing 12 but separated therefrom by a damping volume of oil, in a manner well known in the art.

Inner shaft 16 preferably comprises an outer diameter 17 that is spaced from an inner diameter 15 of outer shaft 14. At least one annular member, for example, bearing 90, is disposed in a gap between outer and inner shafts 14 and 16, and preferably fixed relative to outer shaft 14. Most preferably, a plurality of inner or bumper bearings 90 are disposed between the respective shafts 14 and 16, and aligned one with each of outer bearings 80, at selected locations along length L of outer shaft 14. Bearings 90 are preferably dimensioned such that each one is separated from the outer diameter 17 of shaft 16 by a radial space 19. In a preferred embodiment, radial space 19 is relatively small, on the order of a few thousands of an inch. Together, each set of aligned bearings 80 and 90 comprise displacement limiters 100 for limiting non-axial displacement of inner shaft 14, as described herein.

Bearings 90 are preferably hydrodynamic film bearings, utilizing a thin film of air as the lubricant rather than a liquid such as lubricating oil. Such bearings are known in the mechanical arts, and each preferably consists of a non-rotating bearing housing fixed relative to outer shaft 14, a compliant support structure or bump foil on the bearing housing, and an inner or top foil facing radial gap 19. A solid lubricant coating is provided on the top foil, for instance, the solid lubricant coating taught in U.S. Pat. No. 5,866,518.

Although hydrodynamic film bearings are generally preferred, alternatives are contemplated. For example, Vespel type bearings, also known in the art, consisting of an annular polymide material might be substituted for hydrodynamic film bearings without departing from the scope of the present disclosure. In designs utilizing Vespel bearings, co-rotating shafts may be preferred, to limit the relative velocity between the shafts in accordance with the velocity limits of the bearings. Further embodiments are contemplated wherein a lubricating coating is disposed directly on one or both of inner shaft 16 and the inner diameter 15 of outer shaft 14 such that upon a non-axial displacement of inner shaft 16 it will contact or "bump" against inner diameter 15. Still further embodiments might employ a raised annular surface on one of shafts 14 and 16 and disposed at a selected location therebetween to limit non-axial displacement of inner shaft 14.

INDUSTRIAL APPLICABILITY

In a preferred embodiment, engine 10 is operable over a relatively broad range of speeds. By selecting a radial turbine 40 as the first turbine stage, and radial compressors 20 and 30, turbocharger 11 is also operable over a speed range generally well suited to that of engine 10. When engine 10 is started, or it is otherwise desirable to initiate operation of turbocharger 11, exhaust will begin to flow from exhaust manifold 60 to first turbine 40 via passage 62. Because exhaust gas is preferably supplied to turbine 40 via divided housing portion 41, separate exhaust gas paths will therefore combine at or just prior to entering turbine 40.

Turbine 40 will begin to rotate under the influence of exhaust gas, in turn initiating rotation of high pressure compressor 30 with outer shaft 14. As it begins to rotate, compressor 30 will force air out of outlet 32 and to engine 10 in a conventional manner. Shortly after exhaust gas begins to rotate turbine 40, axial turbine 50 will begin to rotate under the influence thereof. Axial turbine 50 will in turn initiate rotation of compressor 20.

Continued and/or increased exhaust gas flow to turbines 40 and 50 will accelerate the rotational velocity of shafts 14 and 16. Shafts 14 and 16 are preferably configured to counter-rotate, and thus an increasing speed of turbocharger 11 will increase the relative velocities of shafts 14 and 16. In a most preferred embodiment, inner shaft 16 is configured to rotate at a relatively higher RPM than outer shaft 14, thus a relatively modest increase in speed of turbocharger 11 can result in significantly different relative velocities between shafts 14 and 16. Hydrodynamic film bearings 90 generally operate most effectively where the parts journaled thereby are moving relatively fast. A relatively high relative velocity between inner shaft 16 and outer shaft 14 is thus desirable where hydrodynamic film bearings are used. By exploiting counter rotation, the bearing speed is equal to the sum of the shaft rotational speeds.

As the speed of inner shaft 16 increases, inner shaft 16 may begin to vibrate non-axially. A longitudinal axis "P" of inner shaft 16 is shown in FIG. 2. The term "non-axial" should be understood to refer to any vibration of shaft 16, or combination of vibrations, that displace shaft 16 in any direction transverse to axis P. Various parts of turbocharger 11 and engine 10 can impart vibrations to shaft 16. Non-axial vibrations imparted to shaft 16, or rotation of the same can induce shaft 16 to resonantly vibrate, displacing the same toward bearings 90. With sufficient displacement, shaft 16 will eventually begin to contact or "bump" bearings 90 and will be thereby restricted from further non-axial displacement.

In turbocharger 11, the placement of bearings 80 and 90, each set thereof defining one displacement limiter 100, is preferably such that when shaft 16 begins to bend out of axis P at its first bending critical, it will contact bearings 90 at approximately equidistant points about a peak of the vibrational wave. In general, control of vibrations of shaft 16 can be optimized by positioning displacement limiters 100 closer to vibrational peaks than to vibrational nodes. This design concern applies to systems designed to limit shaft vibration at any resonance frequency. In some coaxial shaft assemblies, any of the second, third, fourth or even higher bending criticals may represent the vibrational frequencies most difficult to manage. At differing frequencies, non-axial displacement of shaft 14 will be most pronounced at correspondingly differing positions along its length, and displacement limiters 100 can be positioned accordingly. For example, while a first bending critical defines vibrational nodes at ends of shaft 16, a second bending critical defines two nodes at the ends of shaft 16, but also a node in the middle. Managing a second bending critical might thus call for a different placement of displacement limiters 100 than in an application where the first bending critical is of greatest concern.

While it is preferred to provide one outer bearing 80 aligned with each inner bearing 90, alternative designs are contemplated wherein two outer bearings are provided, spaced equidistantly about each inner bearing. In such a design, a non-axial displacement of the inner shaft will bring the same into contact with the inner bearing, which bears against the outer shaft, the outer shaft in turn bearing equally against both of the corresponding outer bearings.

In any of the contemplated embodiments, operably contacting the outer diameter 17 of shaft 16 with bearings 90 restricts the non-axial displacement of shaft 16, and thus restricts the amplitude of its vibration. Aligning bearings 90 with bearings 80, in turn preferably disposed in housing 12, allows bearings 90 to be supported against displacement via the interface with bearings 80 and housing 12. In other words, in a preferred embodiment, when shaft 16 is non-axial displaced, it is ultimately prevented from further displacement by housing 12. Bearings 90, shaft 14 and bearings 80 may thus be thought of as creating a link between shaft 16 and housing 12 that prevents shaft 16 from moving out of its intended axial position.

In a related aspect, the present disclosure provides a method of reducing vibrational amplitude of an inner shaft of a coaxial shaft system, for example, compound turbocharger 11. The method includes the step of operably positioning at least one displacement limiter at a selected position along a length of an outer shaft of the system. While the present disclosure is described primarily in the context of a compound turbocharger having coaxial outer and inner shafts, those skilled in the art will appreciate that the teachings herein may be applicable in environments other than turbocharger devices. Many devices having coaxial shafts with a need for vibration control might benefit through application of the present disclosure, which is therefore not limited in its breadth solely to a compound turbocharger design. For example, various superchargers and/or combination turbocharger-supercharger devices may utilize coaxial shafts whose performance can be improved with displacement limiters as disclosed herein. Similarly, devices having coaxial drive shafts or similar coaxial shaft assemblies may be suitable to application of the present disclosure.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while the present description is concerned primarily with a dual stage compound turbocharger, embodiments are contemplated wherein a greater number of stages, for example, in a turbocharger having three coaxial shafts, are utilized. In such an embodiment, displacement limiters according to the present disclosure might comprise components between an inner and middle shaft, between the middle shaft and an outer shaft, and between the outer shaft and a housing. Other aspects, features and advantages will be apparent upon an examination of the attached drawing Figures and appended claims.

What is claimed is:

1. A method of reducing non-axial vibrational amplitude in an inner shaft of a coaxial shaft system comprising the steps of:
   operably positioning at least one displacement limiter at a selected position along a length of an outer shaft of the system, wherein the selected position is associated with a selected vibrational frequency of the inner shaft; and
   operating the coaxial shaft system at a speed associated with the selected vibrational frequency; and
   limiting vibrational non-axial displacement of the inner shaft via the at least one displacement limiter when the system is operated at the speed associated with the selected vibrational frequency.

2. The method of claim 1 wherein
   wherein the step of limiting vibrational displacement of the inner shaft comprises contacting the inner shaft with the at least one displacement limiter when the inner shaft reaches a resonance vibrational frequency.

3. A method of reducing vibrational amplitude in an inner shaft of a coaxial shaft system comprising the steps of:
   operably positioning at least one displacement limiter at a selected position along a length of an outer shaft of the system;
   wherein the step of operably positioning at least one displacement limiter about the outer shaft includes positioning a first annular component of the at least one displacement limiter about the inner shaft, and positioning a second annular component of the at least one displacement limiter about the outer shaft;
   aligning the respective annular components of the at least one displacement limiter with one another at the selected position along a length of the outer shaft of the system; and
   spacing the first annular component a radial distance from the inner shaft.

4. A method of reducing vibrational amplitude in an inner shaft of a coaxial shaft system comprising the steps of:
   operably positioning at least one displacement limiter at a selected position along a length of an outer shaft of the system, wherein the selected position is associated with a selected vibrational frequency of the inner shaft; and
   operating the coaxial shaft system at a speed associated with the selected vibrational frequency;
   limiting vibrational displacement of the inner shaft via the at least one displacement limiter when the system is operated at the speed associated with the selected vibrational frequency; and
   aligning the respective annular components of the at least one displacement limiter with one another at the selected position associated with the selected vibrational frequency, wherein the step of limiting vibrational displacement of the inner shaft comprises limiting vibrational displacement via a link between the inner shaft and a housing of the system that includes the annular components and the outer shaft.

5. The method of claim 4 comprising the step of:
   coupling the outer shaft with a first turbine and a first compressor of a compound turbocharger; and
   coupling the inner shaft with a second turbine and a second compressor of the compound turbocharger.

6. The method of claim 5 comprising the steps of:
   rotating the outer shaft in a direction to drive the first compressor; and
   rotating the inner shaft in an opposite direction to drive the second compressor.

7. A compound turbocharger comprising:
   at least one housing;
   a first turbocharger including an outer shaft disposed at least partially within said at least one housing;
   a second turbocharger including an inner shaft coaxial with and extending within said outer shaft; and
   said compound turbocharger having a speed range, and at least one of said inner shaft and said outer shaft having a resonance frequency vibration at a speed within said speed range;
   at least one displacement limiter disposed along a length of said outer shaft at a selected position based on a non-axial displacement of at least one of said inner and outer shafts at the resonance frequency vibration.

8. The compound turbocharger of claim 7 further comprising at least one displacement limiter external of said outer shaft, said compound turbocharger further comprising:
   an air inlet and an air outlet in said at least one housing;
   a first radial compressor coupled with said inner turbine shaft and disposed downstream said air inlet;
   a second radial compressor coupled with said outer shaft and disposed downstream said first compressor;
   an exhaust inlet and an exhaust outlet in said at least one housing;
   a radial turbine coupled with said outer shaft, said radial turbine disposed downstream said exhaust inlet; and
   an axial turbine coupled with said inner shaft and disposed downstream said radial turbine.

9. A compound turbocharger comprising:
   at least one housing;
   a first turbocharger including an outer shaft disposed at least partially within said at least one housing;
   a second turbocharger including an inner shaft coaxial with and extending within said outer shaft;

said compound turbocharger having a speed range, and at least one of said inner shaft and said outer shaft having a resonance frequency vibration at a speed within said speed range;

at least one displacement limiter disposed along a length of said outer shaft at a selected position based at least in part on a displacement of at least one of said inner and outer shafts at the resonance frequency vibration; and wherein said at least one displacement limiter comprises a first plurality of annular members disposed between said inner and outer shafts, and a second plurality of annular members disposed about said outer shaft and aligned one with each of said first plurality of annular members to limit non-axial displacement of said inner shaft.

10. The compound turbocharger of claim 9 wherein said first plurality of annular members comprises a plurality of annular members radially spaced from said inner shaft.

11. The compound turbocharger of claim 10 wherein said first plurality of annular members comprises a plurality of hydrodynamic film bearings aligned one with each of said second plurality of annular members.

12. The compound turbocharger of claim 9 wherein:

said outer shaft is a relatively low speed shaft, said second plurality of annular members comprising a plurality of ball bearing sets about said outer shaft;

said inner shaft is a counter-rotating relatively high speed shaft;

said first plurality of annular members comprising a plurality of bearings fixed relative to said outer shaft.

13. An engine comprising:

at least one housing;

a first turbocharger disposed within said at least one housing and including an outer shaft, said outer shaft coupled with a first turbine and a first compressor;

a second turbocharger disposed within said at least one housing, said second turbocharger including an inner shaft extending within said outer shaft and coupled with a second turbine and a second compressor; and at least one displacement limiter disposed at a selected position along a length of said outer shaft, said at least one displacement limiter including a first component external of said outer shaft and a second component internal of said outer shaft;

wherein said selected position is based on a non-axial displacement of at least one of said inner and outer shafts at a selected vibration frequency thereof.

14. An engine comprising:

at least one housing;

a first turbocharger disposed within said at least one housing and including an outer shaft, said outer shaft coupled with a first turbine and a first compressor;

a second turbocharger disposed within said at least one housing, said second turbocharger including an inner shaft extending within said outer shaft and coupled with a second turbine and a second compressor; and at least one displacement limiter disposed at a selected position along a length of said outer shaft, said at least one displacement limiter including a first component external of said outer shaft and a second component internal of said outer shaft;

wherein said selected position is based at least in part on a displacement of at least one of said inner and outer shafts at a selected vibration frequency thereof;

wherein said at least one displacement limiter comprises;

a plurality of internal annular members disposed between said inner shaft and said outer shaft; and a plurality of external annular members disposed about said outer shaft and aligned one with each of said internal annular members;

wherein aligned ones of said plurality of external annular members and said plurality of internal annular members, together with said outer shaft, each comprise a displacement limiting link between said inner shaft and said housing at a selected position that is based at least in part on displacement of at least one of said inner and outer shafts at a resonance frequency vibration thereof.

15. The engine of claim 14 wherein said at least one displacement limiter further comprises a plurality of displacement limiters disposed symmetrically about a midpoint of at least one of, a length of said outer shaft and a length of said inner shaft.

16. The engine of claim 14 wherein said plurality of internal annular members comprises a plurality of hydrodynamic film bearings fixed relative to said outer shaft.

17. The engine of claim 16 wherein said plurality of hydrodynamic film bearings are radially spaced from said inner shaft.

18. The engine of claim 17 wherein said plurality of external annular members comprises a plurality of ball bearing sets.

19. The engine of claim 18 wherein said first and second compressors are radial compressors, said engine further comprising:

an exhaust manifold fluidly connecting with said first turbine;

said first turbine being a radial turbine operable to re-orient an exhaust flow from said exhaust manifold about 90 degrees;

said second turbine being an axial turbine disposed downstream said first turbine and in line with an exhaust flow from the same.

* * * * *